United States Patent
Paul

(10) Patent No.: US 9,810,162 B2
(45) Date of Patent: Nov. 7, 2017

(54) ACTUATING DEVICE FOR CHANGEOVER VALVES OF AN INTERNAL COMBUSTION ENGINE AND INTERNAL COMBUSTION ENGINE

(71) Applicant: Dr. Ing. h.c. F. Porsche Aktiengesellschaft, Stuttgart (DE)

(72) Inventor: Michael Paul, Weissach (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 57 days.

(21) Appl. No.: 15/075,821

(22) Filed: Mar. 21, 2016

(65) Prior Publication Data
US 2016/0312714 A1   Oct. 27, 2016

(30) Foreign Application Priority Data
Apr. 24, 2015   (DE) .................. 10 2015 106 315

(51) Int. Cl.
*F02D 15/02* (2006.01)
*F02B 75/04* (2006.01)
*F16C 7/06* (2006.01)

(52) U.S. Cl.
CPC ............ *F02D 15/02* (2013.01); *F02B 75/045* (2013.01); *F16C 7/06* (2013.01)

(58) Field of Classification Search
CPC ........... F02D 15/02; F16C 7/06; F02B 75/045
USPC .. 123/48 A, 48 B, 41.37, 78 E, 197.4, 197.3
See application file for complete search history.

(56) References Cited

U.S. PATENT DOCUMENTS

| 5,960,750 | A | 10/1999 | Kreuter | |
| 6,463,914 | B2* | 10/2002 | Augustin | F02M 59/105 |
| | | | | 123/467 |
| 7,021,254 | B2* | 4/2006 | Shiraishi | F02B 75/048 |
| | | | | 123/78 E |

(Continued)

FOREIGN PATENT DOCUMENTS

| DE | 29712459 U1 | 9/1997 |
| DE | 10 2005 055 199 | 5/2007 |

(Continued)

OTHER PUBLICATIONS

British Search Report dated October 17, 2016.
German Search Report dated Oct. 7, 2015.

*Primary Examiner* — Hung Q Nguyen
(74) *Attorney, Agent, or Firm* — Gerald E. Hespos; Michael J. Porco; Matthew T. Hespos

(57) ABSTRACT

An actuating device (11) is provided for changeover valves (10) of an internal combustion engine having an adjustable compression ratio. Each changeover valve (10) is used to control a hydraulic oil flow in hydraulic chambers of an eccentric adjusting device of a respective connecting rod (1) of the internal combustion engine. Each changeover valve (10) has a pick-off element (12) that can be actuated by the actuating device (11). The actuating device (11) has a selector fork (13) for each changeover valve (10) and hence for each pick-off element (12) to be actuated. The selector forks are secured on a support structure (14) and can be moved from a first selection position into a second selection position against the restoring force of a return element (22), and wherein the restoring force of the return element (22) moves the selector forks (13) automatically in the direction of the first selection position.

10 Claims, 3 Drawing Sheets

(56) References Cited

U.S. PATENT DOCUMENTS

| | | | | |
|---|---|---|---|---|
| 7,059,280 B2 * | 6/2006 | Nohara | ................... | F02D 15/02 123/48 D |
| 2013/0247879 A1 | 9/2013 | von Mayenburg | | |
| 2015/0260109 A1 | 9/2015 | Wittek | | |
| 2015/0330298 A1 * | 11/2015 | Paul | ..................... | F02B 75/045 123/48 B |

FOREIGN PATENT DOCUMENTS

| | | |
|---|---|---|
| DE | 10 2010 016 037 | 9/2011 |
| DE | 10 2012 112 461 | 6/2014 |
| DE | 102014118728 A1 | 6/2016 |
| WO | 2014/019684 | 2/2014 |
| WO | 2014019684 A1 | 2/2014 |

* cited by examiner

ACTUATING DEVICE FOR CHANGEOVER VALVES OF AN INTERNAL COMBUSTION ENGINE AND INTERNAL COMBUSTION ENGINE

CROSS REFERENCE TO RELATED APPLICATION

This application claims priority under 35 USC 119 to German Patent Appl. No. 10 2015 106 315.8 filed on Apr. 24, 2015, the entire disclosure of which is incorporated herein by reference.

BACKGROUND

1. Field of the Invention

The invention relates to an actuating device for changeover valves of an internal combustion engine having a variable compression ratio and to an internal combustion engine having a variable compression ratio.

2. Field of the Invention

The compression ratio of an internal combustion engine is defined as the ratio of the total cylinder volume before compression to the remaining cylinder volume after compression. A high compression ratio has a positive effect on efficiency. However, internal combustion engines that have applied ignition, such as spark-ignition engines, generally have a fixed compression ratio, and the selected compression ratio must be low enough to avoid "knock" in full-load operation. However, higher values can be selected for the compression ratio for the part-load range of the internal combustion engine, i.e. with low cylinder filling, which occurs far more frequently, without "knock" occurring. The important part-load range of an internal combustion engine can be improved if the compression ratio can be set in a variable manner.

DE 10 2010 016 037 A1 discloses an internal combustion engine having an adjustable compression ratio. The connecting rods have a big end bearing eye that can be attached to a crankshaft and a small end bearing eye that can be attached to a respective cylinder piston of the internal combustion engine. Each connecting rod has an eccentric adjusting device with an eccentric body and eccentric rods.

The eccentric body of DE 10 2010 016 037 A1 has a piston pin bore that is arranged eccentrically with respect to a center of the small end bearing eye and has a center. The piston pin bore accommodates a piston pin. The eccentric adjusting device is used to adjust an effective connecting rod length $l_{eff}$ measured from the center of the piston pin bore to a center of the big end bearing eye. The eccentric rods of the eccentric adjusting device can be moved to turn the eccentric body and hence change the effective connecting rod length $l_{eff}$. Each eccentric rod is assigned a piston that is mounted or guided movably in a hydraulic chamber. A hydraulic pressure prevails in the hydraulic chambers and acts on the pistons assigned to the eccentric rods. Thus, the movement of the eccentric rods is possible or not possible depending on the oil quantity in the hydraulic chambers.

The adjustment of the eccentric adjusting device is initiated by the action of inertia forces and load forces of the internal combustion engine. These forces act on the eccentric adjusting device during an operating cycle of the internal combustion engine, and the directions of the forces acting on the eccentric adjusting device change continuously during an operating cycle. The adjusting movement is assisted by the pistons acted upon by hydraulic oil, and the pistons act on the eccentric rods to prevent return of the eccentric adjusting device due to varying directions of action of force of the forces acting on the eccentric adjusting device. The eccentric rods that interact with the pistons are attached to the eccentric body on both sides.

The hydraulic chambers in which the pistons are guided can be supplied or filled with hydraulic oil from the big end bearing eye via hydraulic oil feed lines. Check valves prevent the hydraulic oil from flowing back out of the hydraulic chambers into the hydraulic oil feed lines. A changeover valve is accommodated in a bore in the respective connecting rod. The hydraulic chambers are in contact via hydraulic oil outlet lines with the bore which accommodates the changeover valve. The selection position of the changeover valve determines which of the hydraulic chambers is filled with hydraulic oil and which of the hydraulic chambers is emptied, and hence determines the adjusting direction or turning direction of the eccentric adjusting device.

The changeover valve known from DE 10 2010 016 037 A1 comprises an actuating means, a spring device and a control piston.

The hydraulic oil that acts on the eccentric-rod pistons guided in the hydraulic chambers is fed to the hydraulic chambers via the hydraulic oil feed lines, starting from the big end bearing eye. Thus, the respective connecting rod engages on the crankshaft by means of the big end bearing eye in such a way that a connecting rod bearing shell is arranged a crankshaft bearing journal of the crankshaft and the big end bearing eye.

The hydraulic chambers can be vented via the hydraulic oil outlet lines in accordance with the selection position of the changeover valve, and the adjusting direction or turning direction of the eccentric adjusting device depends thereon.

DE 10 2012 112 461 A1 describes another internal combustion engine with an adjustable compression ratio, from which the connecting rod length of the connecting rods can be set in a variable manner. A changeover valve is accommodated in a bore in the respective connecting rod. The valve has a pick-off means, and the respective changeover valve can be actuated by an actuating device acting on the pick-off means.

There is a requirement for an actuating device for the changeover valves of an internal combustion engine having an adjustable compression ratio that permits reliable actuation of the changeover valves of an internal combustion engine while being of simple construction.

It is the object of the invention to provide a novel actuating device for the changeover valves of an internal combustion engine having an adjustable compression ratio and to provide an internal combustion engine having an actuating device of this kind.

SUMMARY

According to the invention, the actuating device has a selector fork for each changeover valve and hence for each pick-off means to be actuated. The selector forks are secured on at least one support structure and can be moved from a first selection position into a second selection position against the restoring force of at least one return element. The restoring force of the return element moves the selector forks automatically in the direction of the first selection position. Thus the actuating device for the changeover valves of an internal combustion engine having an adjustable compression ratio is of simple construction and allows reliable actuation of the changeover valves. The return element returns the selector forks automatically to the first selection position.

All of the selector forks may be secured on a common supporting structure. Thus, all selector forks can be moved jointly from a first selection position into a second selection position against the restoring force of a common return element. The restoring force of the common return element moves all selector forks jointly and automatically toward the first selection position. This construction is particularly simple.

The support structure may have a mounting frame and at least one guide element that can be moved relative to the mounting frame and is common to all the selector forks. The selector forks may be secured on the respective guide element. According to a first variant, the return element is supported on the mounting frame of the support structure and on one of the guide elements or on the guide element, common to all the selector forks of the support structure. According to a second variant, the return element is supported on one of the guide elements or on the guide element common to all the selector forks of the support structure and on or in the crankcase of the internal combustion engine. Thus, the actuating device is of simple construction and allows reliable actuation of the changeover valves.

One actuator may move all of the selector forks jointly from the first selection position into the second selection position against the restoring force of the return element. Thus, when the actuator is active, the actuator moves the selector forks from the first selection position into the second selection position, and, when the actuator is inactive, the return element pushes the selector forks out of the second selection position into the first selection position. Thus, the actuating device is of simple construction and allows reliable actuation of the changeover valves.

Illustrative embodiments of the invention are explained in greater detail by means of the drawing, without being restricted thereto.

BRIEF DESCRIPTION

DETAILED DESCRIPTION

Figure 1:
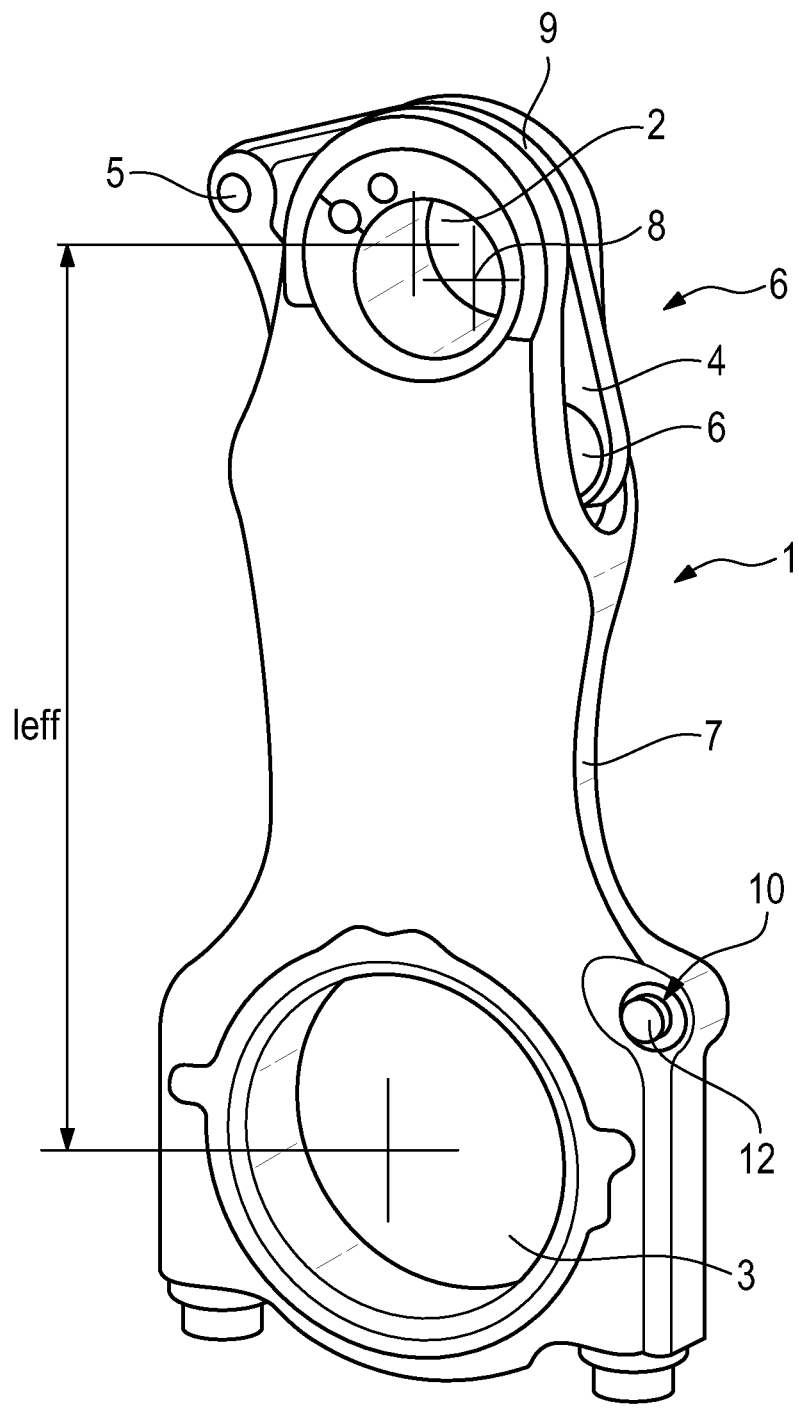
FIG. 1 shows a connecting rod having an eccentric adjusting device and a changeover valve.
Figure 2:
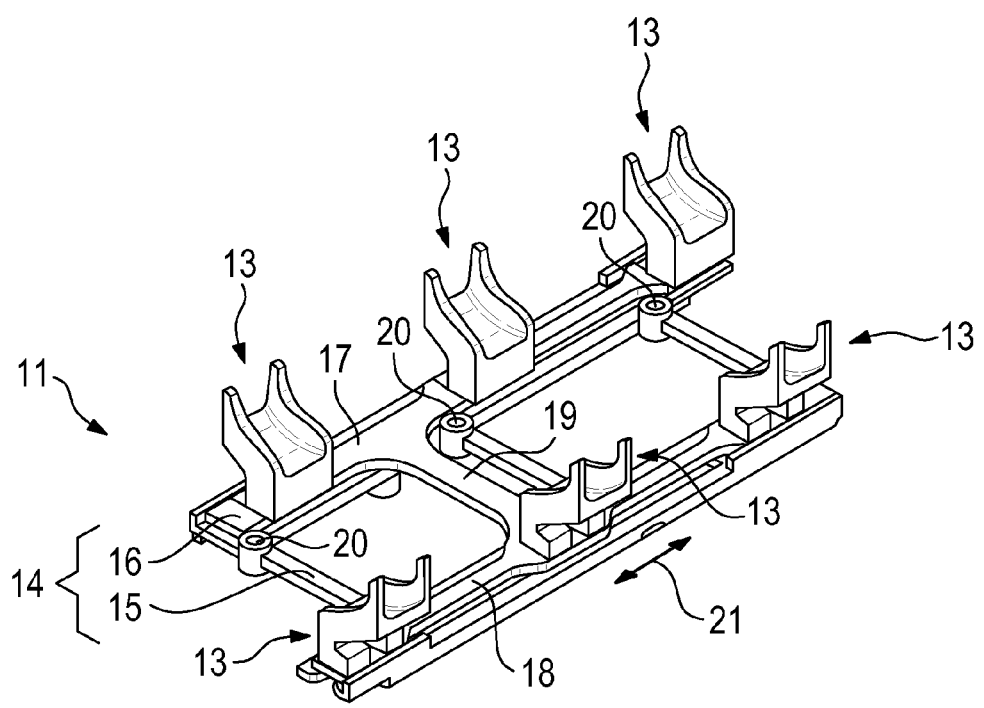
FIG. 2 shows an actuating device for changeover valves of the connecting rods.

FIG. 1 shows a connecting rod 1 of an internal combustion engine having an adjustable compression ratio as per an illustrative embodiment. The connecting rod 1 has a connecting rod main body 7 with a small end bearing eye 2 and a big end bearing eye 3.

The small end bearing eye 2 is used to attach the respective connecting rod 1 to a cylinder piston (not shown) of a respective cylinder of the internal combustion engine. The big end bearing eye 3 is used to attach the respective connecting rod 1 to a crankshaft (not shown) of the internal combustion engine.

The connecting rod 1 in FIG. 1 has an eccentric adjusting device 6, at least one section of which is arranged in the small end bearing eye 2 and that is preferably hydraulically adjustable. The eccentric adjusting device 6 has a piston pin bore arranged eccentrically with respect to a center 8 of the small end bearing eye 2 and has a center. The bore accommodates a piston pin (not shown). The respective connecting rod 1 is coupled to the cylinder piston of the respective cylinder by the piston pin.

The eccentric adjusting device 6 is used to adjust an effective connecting rod length $l_{eff}$ of the connecting rod 1. Turning of the adjustable eccentric adjusting device 6 is initiated by the action of inertia forces and load forces of the internal combustion engine that act on the eccentric adjusting device 6 during an operating cycle of the internal combustion engine. During an operating cycle, the directions of action of the forces acting on the eccentric adjusting device 6 change continuously. The rotary movement or adjusting movement is assisted by pistons acted upon by hydraulic or engine oil that are integrated in the connecting rod arrangement 1 and are guided in hydraulic chambers, or the pistons prevent return of the eccentric adjusting device 6 due to varying directions of action of force of the forces acting on the eccentric adjusting device 6.

The pistons of the eccentric adjusting device 6 are connected operatively on both sides to an eccentric body 9 of the eccentric adjusting device 6 by eccentric rods 4, 5. The eccentric adjusting device 6 can have the pistons, the eccentric rods 4, 5 and the eccentric body 9. The pistons of the eccentric adjusting device 6 are supplied with hydraulic fluid from the big end bearing eye 3 by hydraulic fluid lines (not shown in FIG. 1) via check valves (not shown in FIG. 1). The check valves prevent the hydraulic fluid from flowing back out of the piston volumes of the pistons into the hydraulic fluid lines and into the interior of the internal combustion engine.

A changeover valve 10 is accommodated in a bore in the respective connecting rod 1.

The hydraulic chambers of the eccentric adjusting device 6 of the respective connecting rod 1 are in contact via hydraulic fluid lines with the bore that accommodates the changeover valve 10. The selection position of the changeover valve 10 determines which of the hydraulic chambers is filled with hydraulic oil and which of the hydraulic chambers is emptied, wherein the adjusting direction or turning direction of the eccentric adjusting device 6 depends thereon.

The respective changeover valve 10 of the respective connecting rod 1 has a pick-off means 12 and can be actuated by an actuating device acting on the pick-off means 12. Details of the changeover valve 10 of the respective connecting rod 1 and of the pick-off means 12 of the respective changeover valve 10 are familiar to the person skilled in the art referred to from DE 10 2012 112 461 A1, for example.

The invention relates to an actuating device 11 for such an internal combustion engine having a compression ratio that can be set in a variable manner, namely an actuating device 11 that is used to actuate the pick-off means 12 of the changeover valves 10 of a plurality of connecting rods 1.

An actuating device 11 for actuating a plurality of changeover valves 10 of an internal combustion engine having an adjustable compression ratio has a plurality of selector forks 13. Each selector fork 13 interacts with a pick-off means 12 of a respective changeover valve 10 to be actuated. All of the selector forks 13 preferably are secured on a common support structure 14.

The support structure 14 of the actuating device 11 has a mounting frame 15 and a guide element 16 that preferably is common to all of the selector forks 13 in the illustrated embodiment. The guide element 16 can be moved relative to the mounting frame 15. In the illustrated embodiment, the guide element 16 has two guide rails 17, 18 that extend parallel to one another and are connected firmly to one another by a connecting web 19. Selector forks 13 are secured on each guide rail 17, 18 of the guide element 16. The entire actuating device 11 can be mounted on the crankcase (not shown) of the internal combustion engine by the mounting frame 15, namely by assembly screws (not shown), that extend through assembly openings 20 in the mounting frame 15.

The guide element 16 of the actuating device 11, on which the selector forks 13 are secured, can be moved relative to the mounting frame 15 in the direction of the double arrow 21. This movement of the selector forks 13 of the actuating device 11 relative to the mounting frame 15 enables the pick-off means 12 of the respective changeover valve 10 to be actuated when the changeover valve 10 integrated into the respective connecting rod 1 of the respective cylinder has moved into the region of the respective selector fork 13 of the actuating device 15 during an operating cycle of a cylinder.

The selector forks 13 of the actuating device 11 can be moved jointly with the aid of the guide element 16 of the support structure 14 on which the selector forks 13 are secured. The guide element 16 is common to all of the selector forks 13 in the illustrated embodiment, and can be moved relative to the mounting frame 15 of the support structure 14 and hence relative to the pick-off means 12 of the changeover valves 10 between a first selection position and a second selection position of the selector forks 13.

A defined selection position of the changeover valves 10 of the connecting rods 1 of the internal combustion engine having an adjustable compression ratio can be set in the respective selection position by the selector forks 13 of the actuating device 11.

The movement of the selector forks 13 of the actuating device 11 from the first selection position into the second selection position is accomplished with the aid of an actuator (not shown). All of the selector forks 13 can be moved jointly from the first selection position into the second selection position against the restoring force of a return element 22 that preferably is common to all the selector forks 13 and preferably is designed as a spring element. The restoring force of the return element 22 pushes all of the selector forks 13 jointly and automatically out of the second selection position in the direction of the first selection position when the actuator is not active.

The invention is described below for the case of a return element 22 designed as a spring, although other return elements can also be used.

The actuator that is active moves all selector forks 13 jointly from the first selection position to the second selection position against the spring force of the spring 22.

The spring 22 pushes all selector forks 13 of the actuating device 11 jointly out of the second position into the first selection position when the actuator is inactive.

Figure 3:
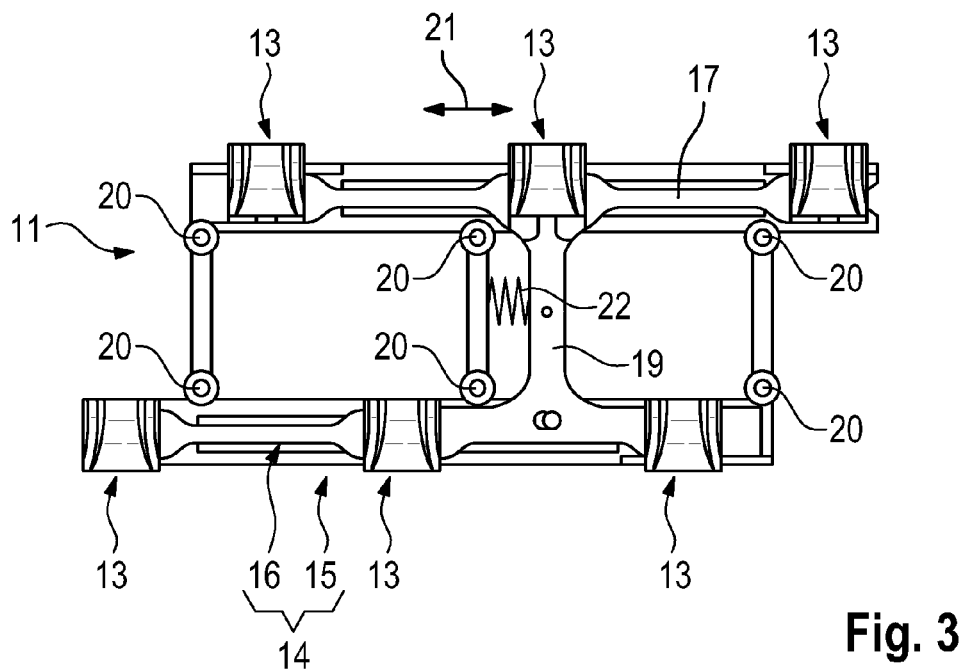
FIG. 3 shows an actuating device according to the invention.

In the embodiment in FIG. 3, the spring 22 engages on the mounting frame 15 of the support structure 14 and on the guide element 16 of the support structure 14. In this case, a first end of the spring 22 is supported on the mounting frame 15 and a second end of the spring 22 is supported on the guide element 16.

Figure 4:
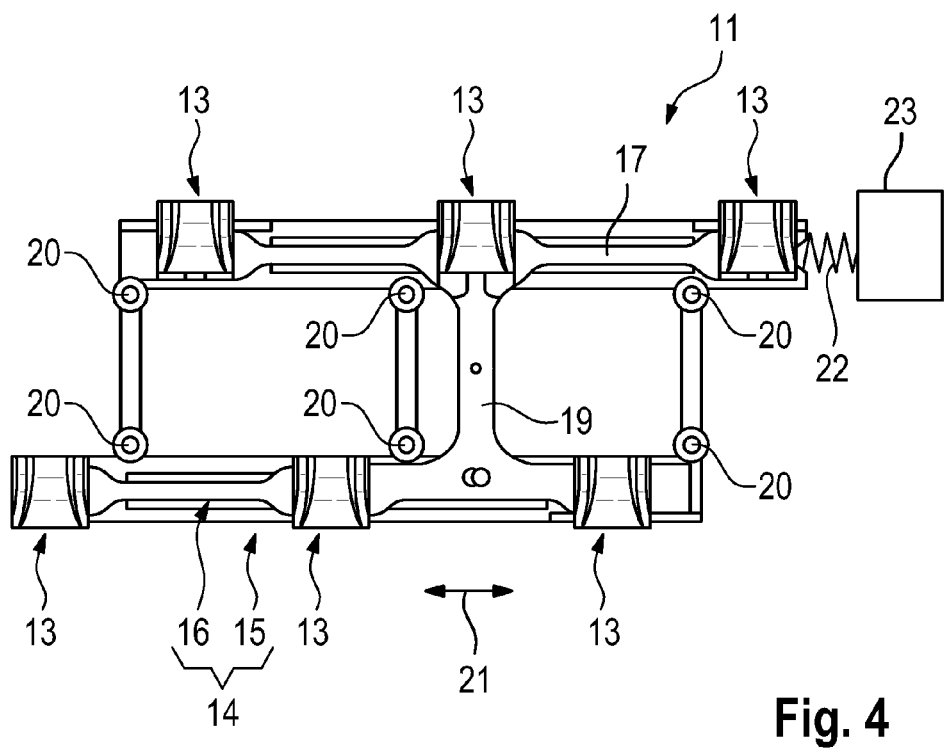
FIG. 4 shows another actuating device according to the invention.

FIG. 4 shows an embodiment of an actuating device 11 in which the spring element 22 is supported on the guide element 16 of the support structure 15 and on or in the crankcase of the internal combustion engine. The guide element is common to all the selector forks in the illustrated embodiment shown. A counterbearing 23 for the spring element 22 that is formed in or on the crankcase of the internal combustion engine is shown in FIG. 4.

The actuating device 11 according to the invention is of simple construction and allows reliable movement of the selector forks 13 between the first selection position and the second selection position. When the actuator is active or energized, it transfers all the selector forks 13 jointly from the selection position into the second selection position, more specifically against the spring force of the respective spring element 22. The spring force of the spring element 22 pushes the selector forks 13 jointly in the direction of the first selection position. When the actuator is inactive or deenergized, e.g. owing to deliberate deactivation or owing to unintentional deactivation due to a power failure, the spring force of the spring element 22 pushes all the selector forks 13 jointly and automatically into the first selection position, with the result that a defined selection position for the selector forks 13 is ensured.

The actuator needs to be energized only to hold the second selection position. Energization is not required for the second selection position. It is thereby possible to reduce the energy requirement for actuation.

The actuator (not shown) which moves the selector forks 13 from the first selection position into the second selection position against the restoring force of the return element 22 is preferably an electric servo motor.

The invention furthermore relates to an internal combustion engine having an adjustable compression ratio which comprises an actuating device 11 of this kind.

Although an actuating device having a supporting structure common to all the selector forks and having a guide element common to all the selector forks and having a return element common to all the selector forks is preferred, it is also possible for the actuating device to have a plurality of coupled support structures and/or a plurality of coupled guide elements and/or a plurality of return elements. The coupling of the support structures and/or guide elements can be accomplished by means of corresponding coupling members or by means of deflection gears.

What is claimed is:

1. An actuating device for changeover valves of an internal combustion engine having an adjustable compression ratio, each changeover valve being used to control a hydraulic oil flow in hydraulic chambers of an eccentric adjusting device of a respective connecting rod of the internal combustion engine, each changeover valve having a pick-off means that can be actuated by the actuating device, the actuating device comprising: a selector fork for each changeover valve and for each pick-off means to be actuated, the selector forks being secured on at least one support structure, and being moveable from a first selection position into a second selection position against a restoring force of at least one return element, wherein the restoring force of the at least one return element moves the selector forks automatically in a direction of the first selection position.

2. The actuating device of claim 1, wherein the at least one return element comprises a single return element and wherein all of the selector forks are secured on the supporting structure so that all of the selector forks can be moved jointly from the first selection position into the second selection position against the restoring force of the return element, wherein the restoring force of the return element moves all the selector forks jointly and automatically in the direction of the first selection position.

3. The actuating device of claim 2, wherein all the selector forks are secured on a common guide element of the support structure that can be moved by the guide element.

4. The actuating device of claim 2, wherein the support structure of the actuating device has a mounting frame and at least one guide element that can be moved relative to the mounting frame, the selector forks being secured on the respective guide element and can be moved relative to the mounting frame by the respective guide element.

5. The actuating device of claim 4, wherein the return element is supported on the mounting frame of the support structure and on one of the guide elements or on the guide element of the support structure.

6. The actuating device of claim 4, wherein the return element is supported on one of the guide elements or on the guide element of the support structure and on or in the crankcase of the internal combustion engine.

7. The actuating device of claim 1, wherein one actuator moves all the selector forks jointly from the first selection position into the second selection position against the restoring force of the return element.

8. The actuating device of claim 7, wherein, when the actuator is active, the actuator moves the selector forks from the first selection position into the second selection position, and, when the actuator is inactive, the return element pushes the selector forks out of the second selection position into the first selection position.

9. The actuating device of claim 1, wherein the return element is a spring.

10. An internal combustion engine that has an adjustable compression ratio, the internal combustion engine having a plurality of connecting rods, each of the connecting rods having a hydraulically adjustable eccentric adjusting device arranged in a small end bearing eye and/or a big end bearing eye for adjusting an effective connecting rod length ($l_{\mathit{eff}}$) of the respective small end bearing eye, wherein an adjusting travel of the eccentric adjusting device is controlled by a changeover valve, the changeover valves being actuated by the actuating device of claim 1.

* * * * *